Inventor
Leon T. Mart,
By
Thorpe & Thorpe
Attorneys

Patented Sept. 1, 1936

2,052,783

UNITED STATES PATENT OFFICE 2,052,783

COOLING TOWER

Leon T. Mart, Johnson County, Kans.

Application August 12, 1935, Serial No. 35,837

5 Claims. (Cl. 261—29)

This invention relates to cooling towers and has for its object to produce means to increase the efficiency of such towers. Cooling tower efficiency is dependent on intimate contact between the air and finely divided water, the cooling being brought about both through evaporation of a part of the water and by direct heat transfer through contact. I have found, particularly in forced or induced draft free-fall type of cooling towers, that there is a comparatively heavy unbroken film of water constantly flowing down the inner face of the walls or sides of the tower. This water, in comparison to that having free-fall in finely divided form, is subjected to but slight cooling effect and by commingling with the larger volume of water in the collecting basin at the bottom of the tower, raises the effective temperature of all of the water.

The prime object of the present invention, therefore, is to provide means for removing or interrupting this film of water and returning it to the tower in finely divided form and preferably in counter-flow relation to the air stream.

With the general objects named in view and others as will hereinafter appear, the invention consists in certain novel and useful features of construction and organization of parts as hereinafter described and claimed; and in order that it may be fully understood, reference is to be had to the accompanying drawing, in which:—

Figure 1:
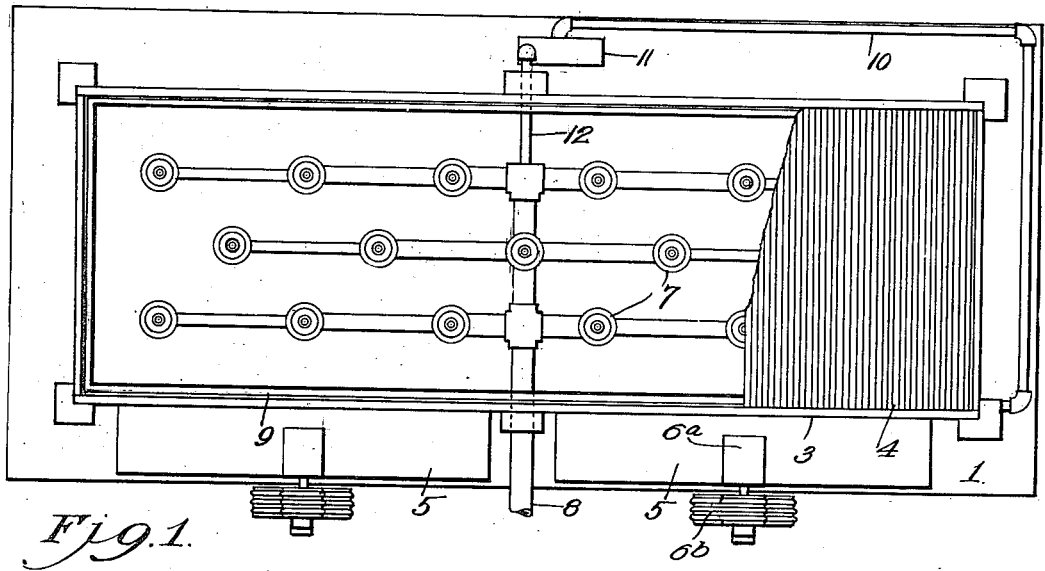
Figure 1 is a top plan view of a cooling tower with the drift eliminator partly broken away.
Figure 2:
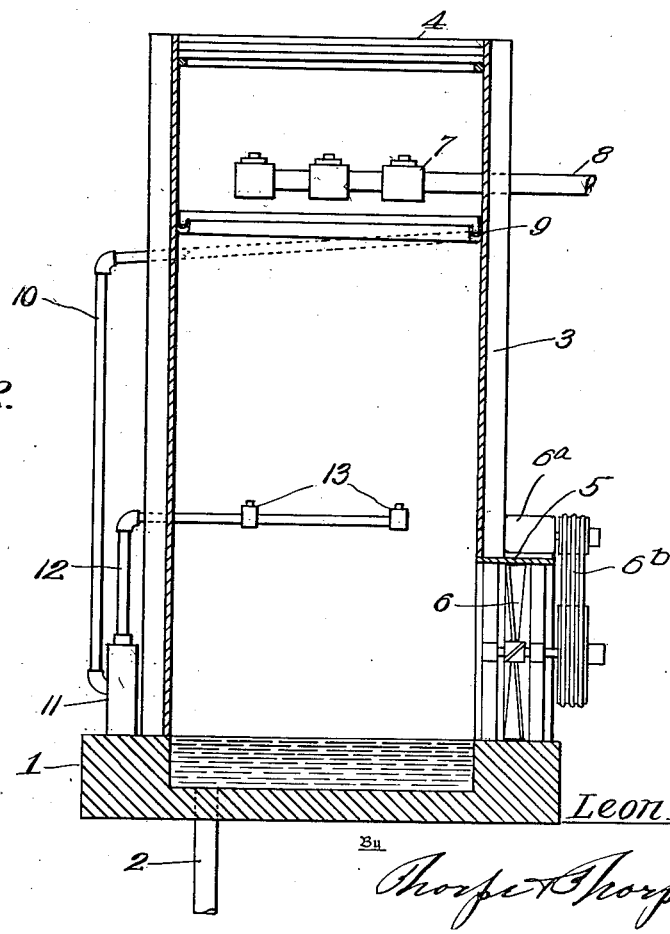
Figure 2 is a section through the tower.

In the said drawing, where like reference characters identify corresponding parts in all of the figures, 1 is a water collecting basin from which a cold water return line 2 leads. The walls of the basin may form the foundation of a cooling tower 3, illustrated as having its upper end equipped with a drift eliminator 4 and as having a series of air entry openings 5 at its lower end, in each of which a fan 6 is mounted for setting up a forced flow of air through the tower. Of course, if desired, the fans may be arranged for inducing a draft through the tower by being located at the exit end thereof. The fan is driven by a motor 6a through the drive belts 6b.

Arranged adjacent the upper end of the tower is a water distributing apparatus for discharging the water in finely divided form, said distributing apparatus in the present case, for convenience of illustration, being shown as a plurality of water spray nozzles 7 arranged to evenly distribute the water across the cross-sectional area of the tower as common in the art. The hot water to be cooled is delivered through the pipe 8. The water as it freely falls to the collecting basin is cooled by the action of the upwardly flowing air. In such cooling towers, there is a constant film of water flowing down the walls of the tower, which, since it is not finely divided and in intimate contact with the air flowing in counter-flow relation, enters the collecting basin at a materially higher temperature than the larger volume of water, and raises the total effective temperature of the water by an appreciable degree. In order to overcome this difficulty and increase the efficiency of cooling towers, this film of water may be withdrawn from the walls in a number of ways, as by providing a trap 9 or gutter within the tower, preferably a slight distance below the spray nozzles. In the type of construction shown herein, the gutter 9 around the four sides of the rectangular tower has a constant slope and gradually increases in capacity from one corner to the diagonally opposite corner, where it is connected with a pipe line 10. This increase in capacity, obviously is to accommodate the volume of water at the lowest part of the trap.

The pipe 10 disposes of this hot water in any convenient way, such as by delivering it to a pump 11, which discharges the water through a pipe line 12 to a second water distributing system within the tower, such as the series of spray nozzles 13, between the upper distributing nozzles 7 and the collecting basin 2. This discharge of water from the second nozzles finely divides the hot water for intimate counter-flow with the air for the cooling of the water, and results in the cooling of such water to a lower temperature than would occur if the film of water was permitted to flow uninterruptedly down the tower walls into the receiving or collecting basin at the lower end of the tower.

From the above description it will be apparent that I have produced a construction embodying the features of advantage set forth as desirable, and while I have illustrated what now appears to be the preferred form of the invention, it is to be understood that I reserve the right to all changes within the spirit of the invention and without the ambit of the prior art.

I claim:—

1. The process of cooling water in a cooling tower consisting in the discharge of the water in finely divided form within a cooling tower to provide a major flow for free-fall and a minor flow adhering to the tower walls, entrapping that portion of the water flowing down the walls of the tower, and returning such entrapped water to the tower in finely divided form.

2. The process of cooling water in a cooling tower in which the water forms a major flow for free-fall and a minor flow, the latter flowing down the side walls of the tower, which comprises entrapping such water contacting the tower walls which has been ineffectively exposed to the air in the tower, and returning such entrapped water, in finely divided form, for further cooling.

3. A process of cooling water in a cooling tower where the water enters a collecting basin as a major and minor flow, the minor flow flowing down the inside surface of the cooling tower walls, which comprises entrapping such minor flow independently of the larger volume of freely falling water and returning such trapped water for recirculation through the tower out of contact with the tower walls.

4. The method of cooling water which consists in spraying the water within the upper end of a cooling tower for intimate contact with counterflowing air by free-fall to the bottom of the tower, withdrawing from the inner face of the tower such film of water as may adhere to and flow down the tower wall where the air flow is retarded by friction and the water is not in comminuted form, and the redischarge of such withdrawn water in finely comminuted form into the moving air column for further cooling.

5. The method of increasing cooling tower efficiency in which water is normally delivered to a collecting basin in the form of a major flow and a minor flow, the minor flow being at a higher temperature than the major flow and travels down the side walls of the tower, which consists in interrupting the minor flow of hotter water before it enters the collecting basin, and the return of such minor flow of water to the cooling tower in comminuted form for further cooling.

LEON T. MART.